Oct. 23, 1923. 1,471,840
S. A. ESKILSON
COOKING APPARATUS FOR GAS, LIQUID FUEL, OR ELECTRICITY
Filed Oct. 7, 1920    2 Sheets-Sheet 1

Oct. 23, 1923.

S. A. ESKILSON 1,471,840

COOKING APPARATUS FOR GAS, LIQUID FUEL, OR ELECTRICITY

Filed Oct. 7, 1920   2 Sheets-Sheet 2

Patented Oct. 23, 1923.

1,471,840

UNITED STATES PATENT OFFICE.

SVEN AUGUST ESKILSON, OF STOCKHOLM, SWEDEN, ASSIGNOR TO SVENSKA AKTIEBOLAGET GASACCUMULATOR, OF STOCKHOLM, SWEDEN.

COOKING APPARATUS FOR GAS, LIQUID FUEL, OR ELECTRICITY.

Application filed October 7, 1920. Serial No. 415,339.

*To all whom it may concern:*

Be it known that I, SVEN AUGUST ESKILSON, citizen of Sweden, residing at Stockholm, Sweden, have invented certain new and useful Improvements in Cooking Apparatus for Gas, Liquid Fuel, or Electricity, of which the following is a specification.

The present invention refers to cooking apparatus for gas, liquid fuel or electricity, and has for its purpose to control the supply of heating fluid in such a way, that said supply is decreased or cut off, when the content of the boiling pot is beginning to boil, so as to avoid its boiling over and inconveniences connected therewith. The apparatus is placed on or within the boiling pot or beside the same, in any case in such a manner, that it is subjected to the influence of the steam generated in the boiling pot when boiling enters. The apparatus may be subjected to such influence either through the heat transmitting capacity of the steam or through the moisture contained in the steam. The essential part of the apparatus consists of an actuating element, which may be solid, liquid or gaseous, and which is subjected to the influence of the steam generated when boiling begins, and which thereby is deformed or altered as to its dimensions, either owing to the action of the moisture contained in the steam or on account of the heat transmitted by the steam. The movements of the element, caused by said deformation or alteration of its dimensions are transmitted according to the invention by means of a suitable transmission to the controlling device of the heating medium of the boiling pot.

According to one construction the apparatus comprises a casing or chamber, in which a fluid (air, gas or liquid) is contained, said fluid being subjected to the heating influence of the steam, generated when the content of the boiling pot boils. By the said influence of the steam the fluid in the casing or chamber is expanded and displaces a movable wall (diaphragm piston or the like), which actuates the controlling device of the heating medium of the boiling pot, by cutting off or throttling the gas supply to a burner or cutting out the boiling apparatus from an electric circuit.

The drawings illustrate several different constructions of an apparatus according to the invention and its application to a boiling pot.

Figure 1:
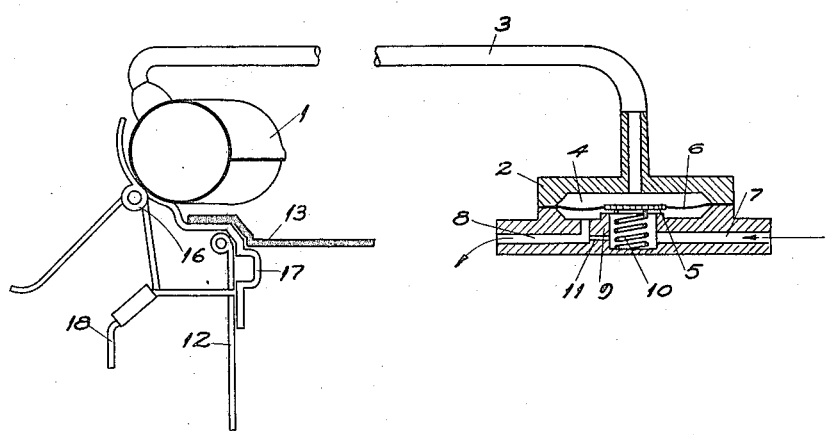
Figure 2:
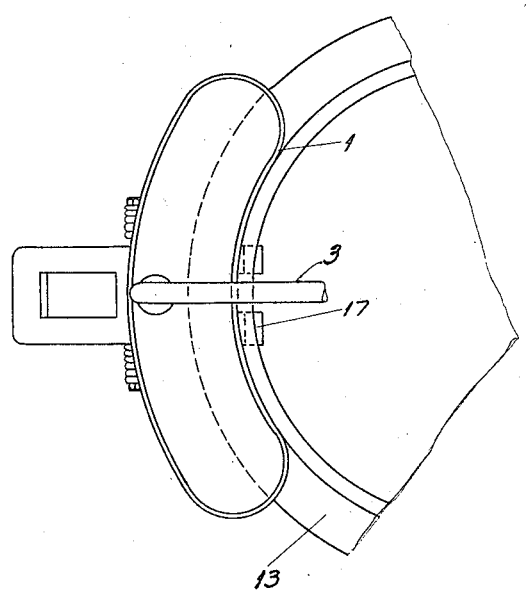
Figure 3:
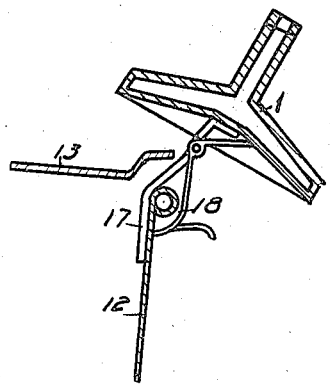
Figure 4:
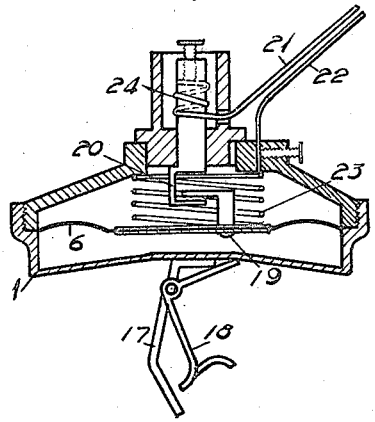
Figure 5:
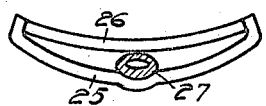
Figure 6:
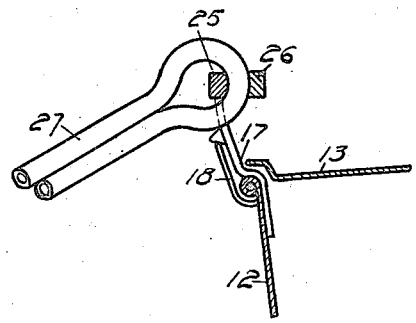

Fig. 1 is a side elevation of the preferred form of the invention, applied, partly broken away and showing the gas regulator in cross-section, Fig. 2 is a top plan view of the left hand portion of Fig. 1, Fig. 3 is a fragmentary cross-sectional view of a slightly modified form of heating drum, Fig. 4 is a central, vertical, lateral, cross-section of a combined drum and regulator, Fig. 5 is a top plan view of a moisture actuated gas regulator, and;

Fig. 6 is a fragmentary cross section of the same, as applied to a cooking vessel.

In the construction disclosed by Figs. 1 and 2, the apparatus comprises a casing or expansion chamber 1 and a regulating or diaphragm chamber 2, which are connected by means of a tube or pipe 3. The casing 1 is intended to be subjected to the steam, generated in the pot when boiling begins. The chamber 2 is divided in two compartments 4 and 5 by a diaphragm 6, a piston or a similar movable partition in such a way, that the compartment 4 communicates with the interior of casing 1. The compartment 5 communicates with a passage 7, which is jointed to a gas supply pipe, and also with a passage 8, communicating with a burner of a gas stove or other gas cooking apparatus. The communication between the passages 7 and 8 may be controlled by a valve, formed by the central part of the diaphragm 6 and a central, hollow shoulder 9 in the casing 2, as a valve seat, communicating with the gas supply pipe, connected to the passage 7. A spring 10 tends to keep the diaphragm 6 unseated.

The apparatus works in the following manner. The casing 1 is applied to the pot in such a manner, that it is subjected to the steam, generated when the content of the pot begins to boil. Thus the fluid, contained in the casing 1, is heated, expands and establishes a pressure on the diaphragm 6, so as to move said diaphragm towards the seat of the shoulder 9, cutting off or throttling the communication between the passages 7 and 8 so that the flame, burning in the burner of the gas stove, is extinguished or diminished. In the wall of the shoulder 9 is a small hole 11, through which gas, necessary for a lighting flame, flows to the burner or to a special lighting burner. If the content of the pot is getting cool, so that the steam generation ceases, the burner of the gas stove is again lighted, as the fluid contained in the casing 1 diminishes its volume and permits the spring 10 to move the diaphragm from the seat, opening the communication between the passages 7 and 8.

Fig. 2 illustrates another construction for applying the casing 1 to the pot. The casing 1 is here provided with an arm or lip 17, extending downwards, and adapted to be inserted between the pot 12 and the cover 13. A spring clamp 18, fixed to the casing and pressing with its lower end against the wall of the pot or against the edge of the pot, secures the casing in place.

The casing 1 may be a bowl shaped as according to this construction, in order to catch the steam flowing out from the boiling pot see Fig. 3.

The invention is appliable for heating devices either by means of fluid fuel or by means of electrical energy. In the first case the apparatus may be arranged to cut off the supply of fluid fuel to a vaporizer or to cut off an electric heating element, when the content of the pot begins to boil, or at a predetermined point or temperature. In the last case the apparatus breaks the circuit of the supply of the electric current to the heating device when the boiling begins. Especially in electrical cooking apparatus it may be suitable to build the casing 1 and chamber 2 as a single unit so as to obtain only one casing or chamber with a diaphragm, which when moving opens or closes the electrical heating circuit.

Fig. 4 shows a construction of such an apparatus. The casing 1, exposed to the steam in the pot, is here closed by the diaphragm 6, to which is fixed a contact piece 19, which normally makes contact with another contact piece 20, to which the one conductor 21 of the circuit, is connected. The other conductor 22 of said circuit is connected with a spring 23, tending to keep the contact pieces 19 and 20 towards one another.

When steam, generated in the pot, acts upon the casing 1, the fluid, contained in the same expands, and when the action of the spring 23 is overcome by the pressure thus established, the contact between the pieces 19 and 20 is broken so that the electrical heating circuit is cut out wholly or partly, as desired.

In order to avoid sparking when the contacts are broken, the contact pieces 19 and 20 are made of soft iron and the piece 20 is formed part of an electromagnet 24, as shown, whereby a magnetic force together with the spring 23 keeps the contact pieces towards one another. The breaking of the contact will be sudden, whereby sparks are avoided or diminished.

The constructions above described form examples of the application of the invention, when the said element, constituting the essential part of the apparatus, is subjected to an alteration of its dimension owing to transmission of heat from the steam. As mentioned the invention however is employable when the element is of such a nature, that it is influenced by the moisture, contained in the steam, and thereby swells or shrinks.

Figs. 5 and 6 illustrate a construction of such an apparatus.

25 indicates a holder of suitable shape for a body 26, which is of such a nature, that it deforms, when being exposed to the action of the steam from the pot, by expanding or shrinking on account of the moisture contained in the steam. Between the body 26, which may be in the form of a bar or disk, firmly fixed in the holder 25, and said latter, a gas tube 27 leading to the burner of the gas stove, is placed. According to the construction it is assumed, that the body 26 expands by the influence of the moisture, and therefore the gas tube 27 will be pressed together, when steam generated in the pot, strikes the body 26. Said body may be made of wood or any other suitable material.

In the construction of the holder 25 as according to Fig. 5 the body 26 is placed on the concave outer face of the holder, if the element is of such a nature as to shrink when exposed to the moisture of the steam. As example of such bodies certain textile substances may be mentioned. Said device may be understood without any special drawing. It should be obvious, that said devices also may be employed for electrical cooking apparatus, wherein the body 26 serves for opening or closing the circuit.

Instead of being applied at the edge of the pot, as shown on the drawings, the apparatus also may be applied above a hole in the cover of the pot, through which the steam generated in the pot, flows out and strikes the apparatus. The sensitive or actuating element must be so placed, of course, as to be affected by steam from or in the pot. It is obvious that there are a great number of arrangements and positions in which this may be effected.

If when the body consists of a material, which swells or shrinks when exposed to steam, the movement of the body would be too small for enabling a direct action upon a gas supply pipe or an electric contact, the movement of the body may be increased, say by means of one or more levers, so as to obtain the necessary movement. Thus the body may actuate the short arm of a lever, the other arm of which actuates a gas pipe or one of two contact pieces.

Figs. 8 and 9 illustrate a modified form of the casing. Said casing is here in the shape of a pipe, which is bent approximately in the form of the pot. By this construction the steam arising from the pot, will lick around all sides of the casing, so as to heat the same more surely than according to the construction shown in the other figures. The manner of applying the casing to the edge of the pot is similar to that shown in Fig. 4.

Having now described my invention and in what manner the same is to be carried out what I claim is:—

1. In combination with a cooking vessel, means for heating the same, means actuated by steam generated in the aforesaid vessel and automatically regulating said heating means, and means for both maintaining an open passage for escape of steam from said vessel and for supporting said regulating means in the path of the escaping steam for actuation thereby.

2. In combination with a cooking vessel, means for heating the same, an expansion chamber of circular lateral cross section and having a longitudinal configuration corresponding to that of the upper edge of said vessel and adapted to contain an expansible fluid, devices actuated by said fluid to automatically regulate said heating means, and means for both maintaining an open passage for escape of steam from said vessel, and for supporting said chamber in the path of the escaping steam.

In testimony whereof, I have signed my name to this specification in the presence of two subscribing witnesses.

SVEN AUGUST ESKILSON.

Witnesses:
 WALKMAR BORNAU,
 SINRICO MOLIUS.